Sept. 13, 1927.
J. G. HENDRICKSON
1,642,369
WRITING AND DRAWING APPARATUS
Filed Dec. 8, 1922    5 Sheets-Sheet 1
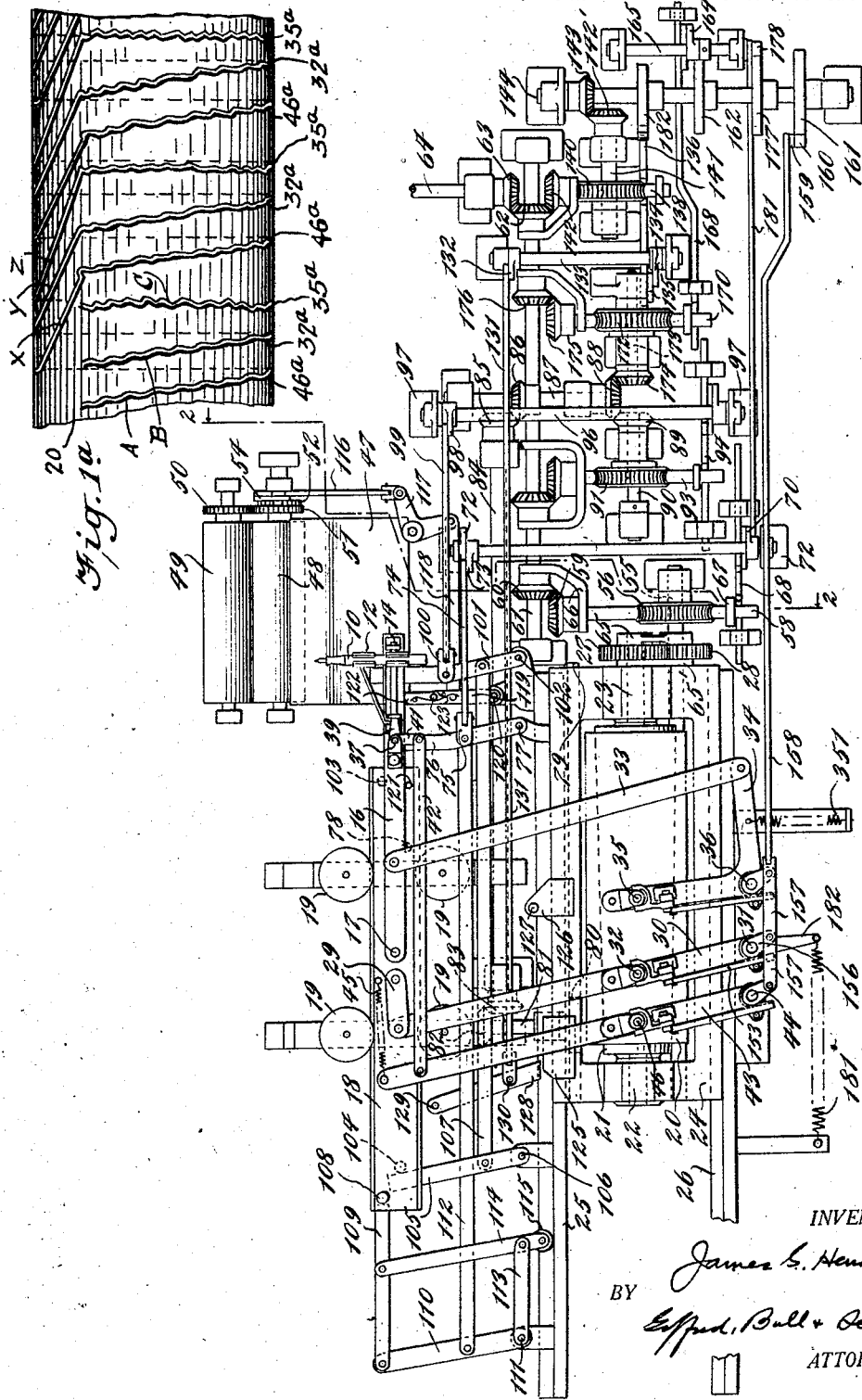
INVENTOR.
James G. Hendrickson
BY
Offord, Bull & Deull
ATTORNEYS

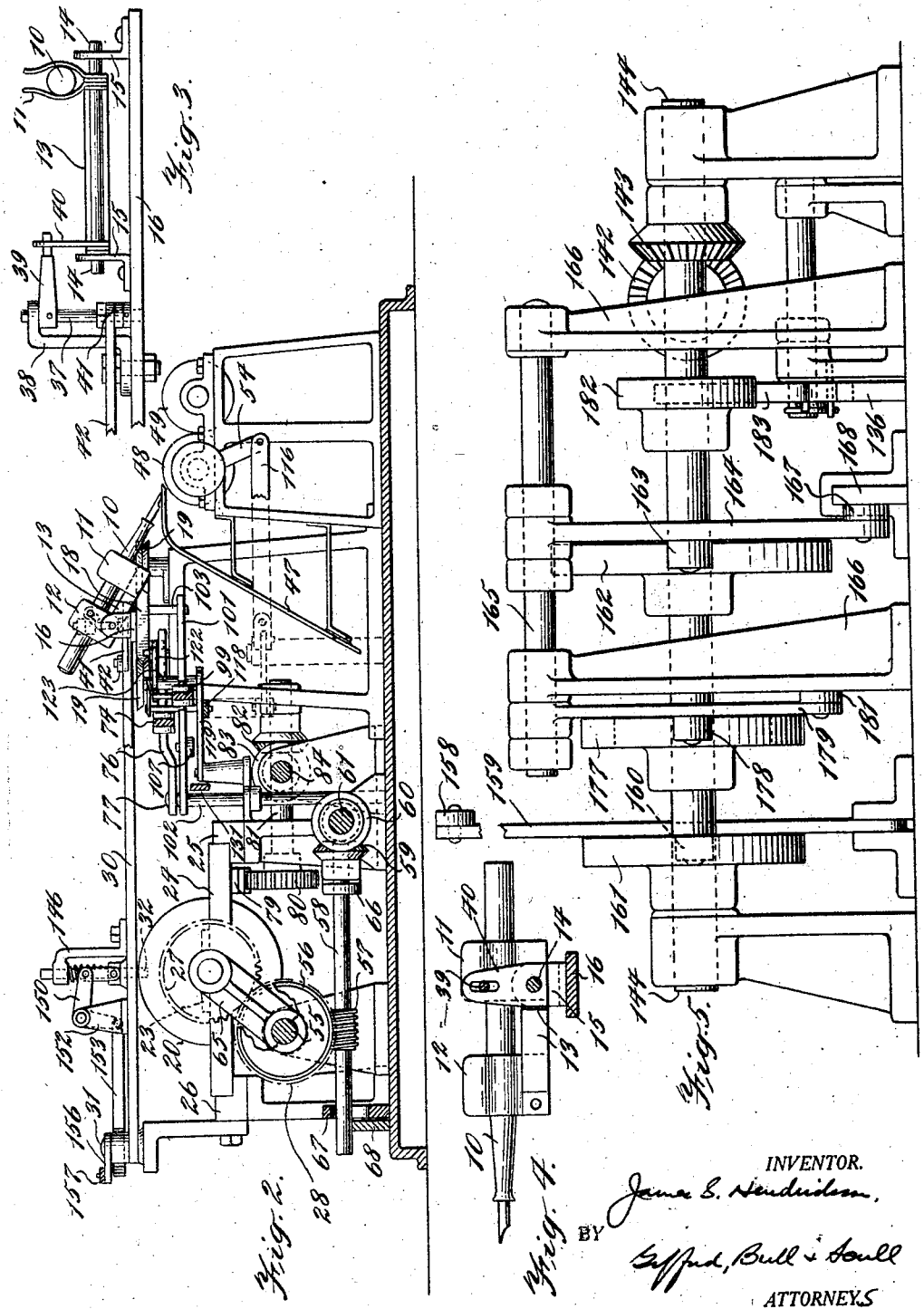

Sept. 13, 1927.
J. G. HENDRICKSON
WRITING AND DRAWING APPARATUS
Filed Dec. 8, 1922
1,642,369
5 Sheets-Sheet 3
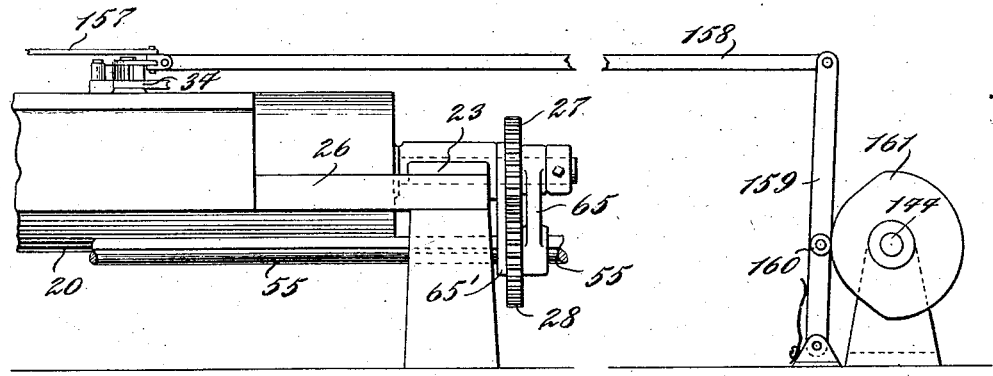
Fig. 6.
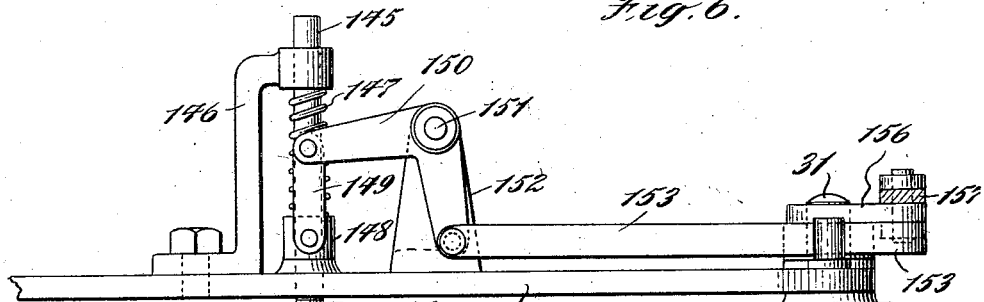
Fig. 7.
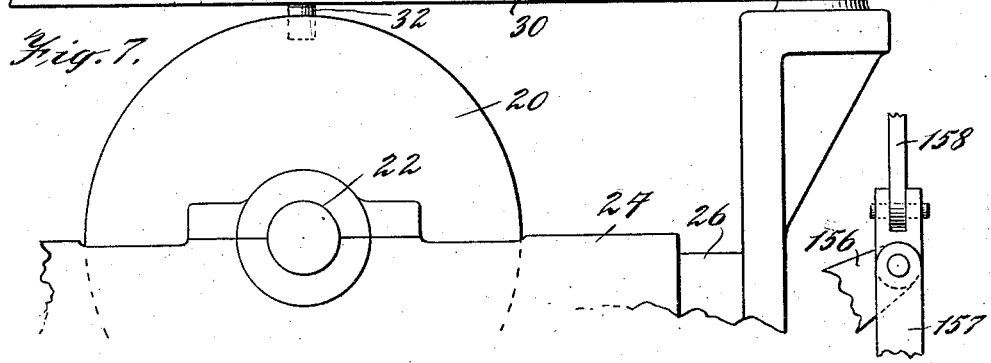
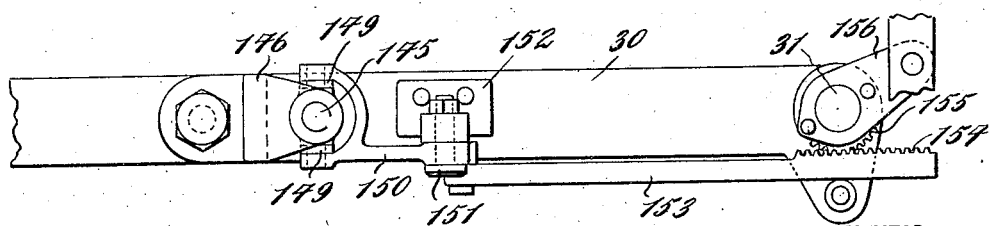
Fig. 8.
INVENTOR.
James G. Hendrickson
BY Gifford, Bull & Scull
ATTORNEYS Sept. 13, 1927.  
J. G. HENDRICKSON  
1,642,369  
WRITING AND DRAWING APPARATUS  
Filed Dec. 8, 1922  
5 Sheets-Sheet 4
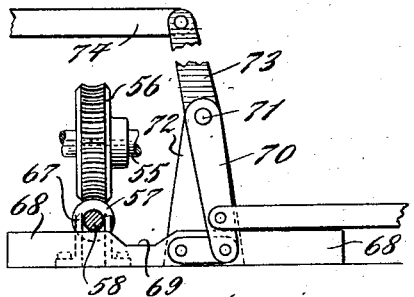
Fig. 9.
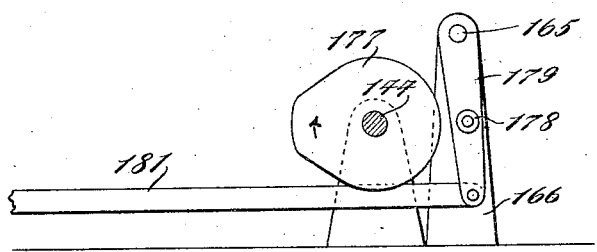
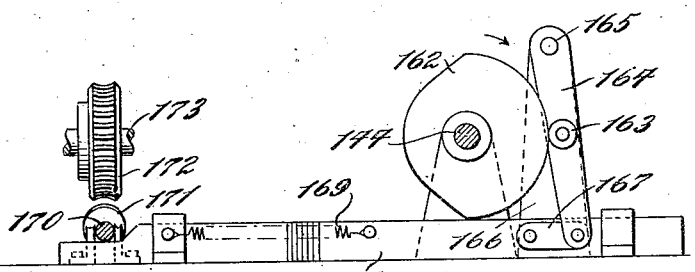
Fig. 10.
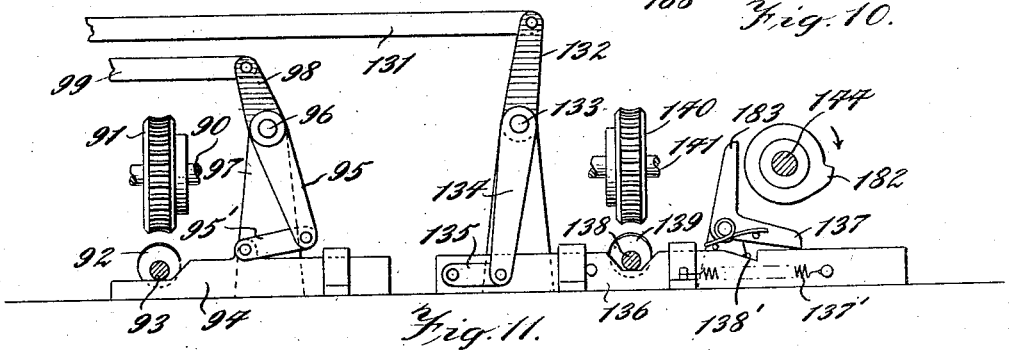
Fig. 11.
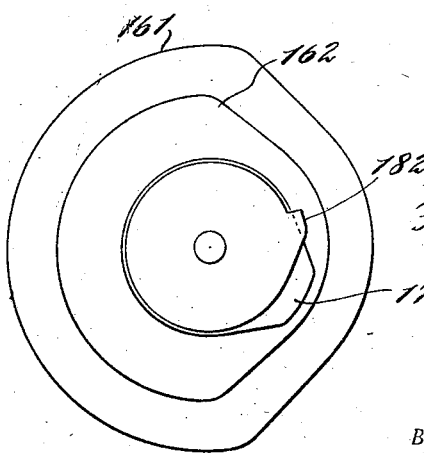
Fig. 12.
INVENTOR.  
James G. Hendrickson  
BY  
ATTORNEYS

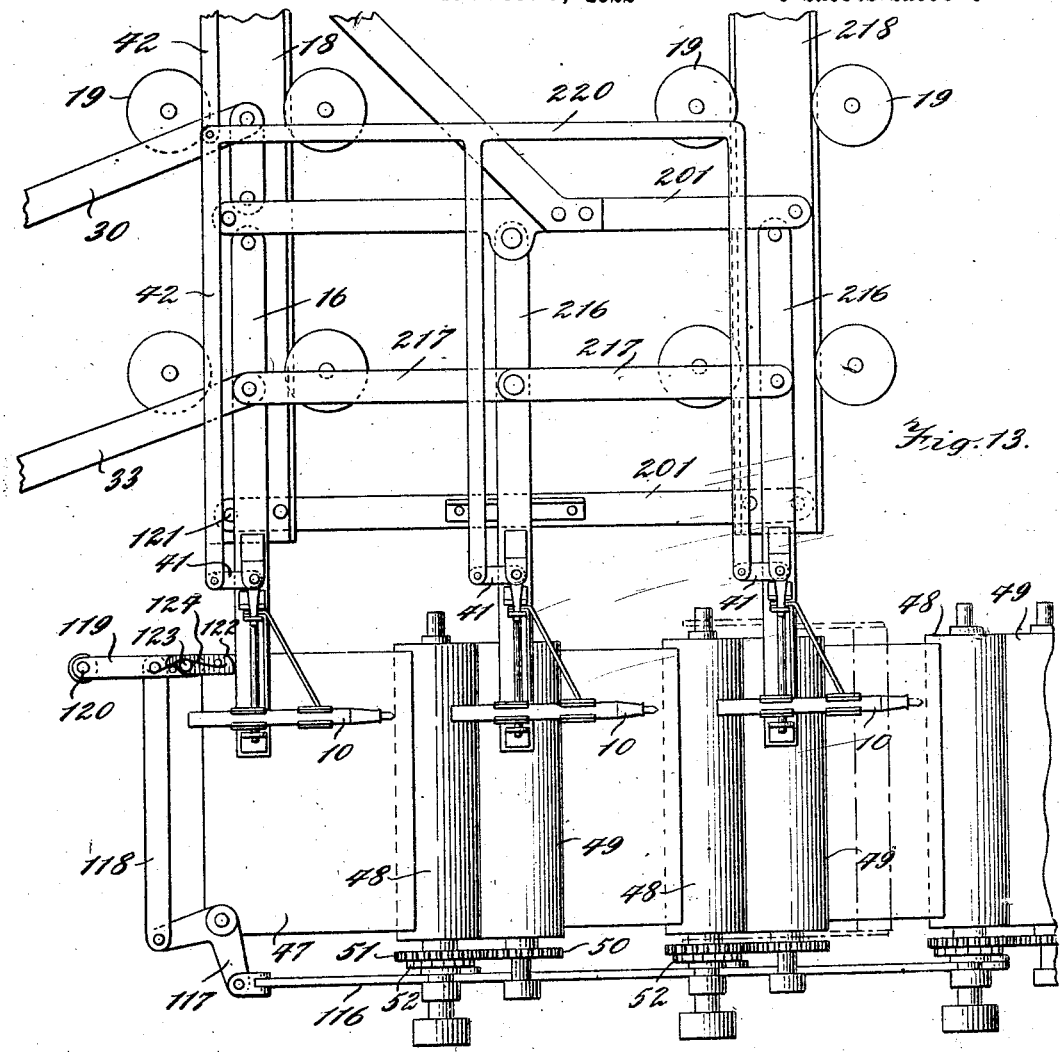
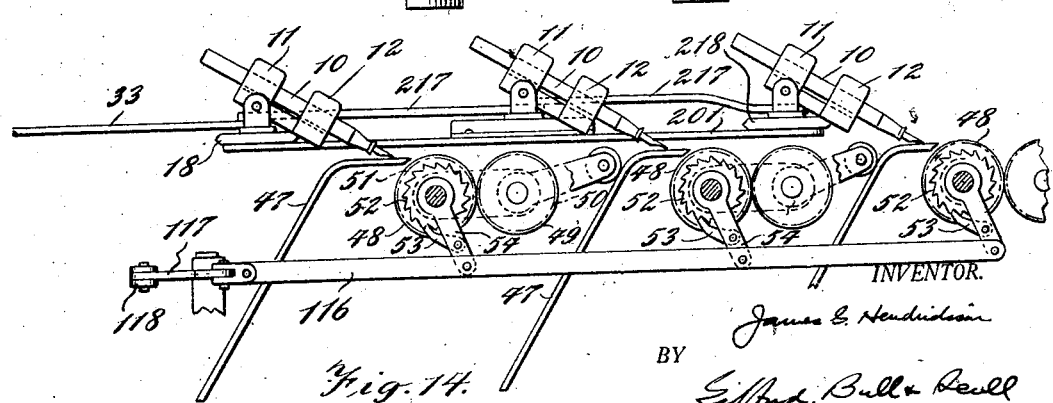

Patented Sept. 13, 1927.

1,642,369

UNITED STATES PATENT OFFICE.

JAMES G. HENDRICKSON, OF BAYONNE, NEW JERSEY.

WRITING AND DRAWING APPARATUS.

Application filed December 8, 1922. Serial No. 605,629.

My present invention relates to a mechanism for reproducing writings or drawings, and particularly one in which several lines of writing or the like can be reproduced automatically.

In the drawings Fig. 1 is a more or less diagrammatic plan view of an illustrative embodiment of my invention; Fig. 1<sup>A</sup> is a development of a portion of a cam cylinder shown in Fig. 1 with typical forms of cam grooves therein; Fig. 2 is a section on the line 2—2 of Fig. 1 on a somewhat larger scale; Fig. 3 is a view of a portion of Fig. 2 looking from the right thereof; Fig. 4 is a detail of Fig. 3; Fig. 5 is an enlarged view of the cam arrangement shown at the right of Fig. 1; Fig. 6 is an enlarged elevation of some of the parts shown in Fig. 1; Fig. 7 is a view of a portion of Fig. 1 looking from the left thereof; Fig. 8 is a plan view of Fig. 7; Figs. 9, 10 and 11 are elevations of portions of Fig. 1 on a larger scale, each showing a separate portion of the mechanism so as to make the construction clearer; Fig. 12 is a diagram of the cams, Fig. 13 is a plan and Fig. 14 an elevation of a modification.

Like reference characters indicate like parts in the several views.

In the illustrative apparatus, I have shown a machine designed so that a pen, pencil or other marking device will be moved across a writing-receiving support in a predetermined path as to write a line of writing and, when this line is completed, the machine will automatically bring the pen back to original position, shift the writing-receiving material to present a clean surface for the next line and thereupon automatically write a new line. This is repeated until the end of the last line, when all of the mechanism is restored to its original position, ready to repeat the operation after a new sheet of paper or the like has been substituted for the one already written on.

As the marking device, I have shown a fountain pen 10, though it will be understood that a pencil or any other similar device may be used and that by the term "pen" as used in the claims, I mean any other similar marking device. The pen 10 (see Figs. 3 and 4) is held in a pair of spring clips 11 and 12 at the normal writing angle, these clips being connected to a cradle 13 pivoted at 14 in brackets 15 which are connected to a swinging member 16, pivoted at 17 on a slide 18 this slide being supported for longitudinal movement between rollers 19. With this construction, it will be seen that by a longitudinal motion of slide 18 and a swinging of member 16, the point of pen 10 may be made to follow any path necessary for writing or drawing, and that, by turning cradle 13 on pivot 14, the penpoint may be raised or lowered between each word or the like.

These motions are given to the several parts by means of properly designed cams. In the illustrative form, the operating cams are formed as grooves in a cam cylinder 20 which, in the form illustrated, may be a shell having a conical bore and connected to a conical member 21 having capped bearings 22 and 23 in a slide 24 supported on slideways 25, 26. Cam cylinder 20 is rotated through spur gears 27, 28 by means to be described more fully hereinafter.

Fig. 1<sup>A</sup> shows the cylindrical surface of a portion of the cam 20 with a set of typical cam grooves therein, these grooves, in the form illustrated, being respectfully 46<sup>a</sup>, 32<sup>a</sup> and 35<sup>a</sup>, the groove 46<sup>a</sup> for the complete circumference of the cam 20 being made up of the two parts A and X the groove 32<sup>a</sup> being made up of the part B and the part Y, and the groove 35<sup>a</sup> being made up of the part C and the part Z, the parts A, B and C being what may be termed the active portions of the cam groove and the parts X, Y and Z, the part of the groove which enables the cam rollers and the cam 20 to move relatively longitudinally of the cam axis to bring the rollers to further active portions of the respective grooves, as will be pointed out more in detail hereinafter.

Connected to the slide 18 through a link 29 is a cam lever 30 pivoted at 31 on the frame of the machine and carrying a cam roller or stud 32 to engage the cam groove 32<sup>a</sup> in cam cylinder 20, so that as cylinder 20 is rotated, roller 32 will be swung to the right from its position shown in Fig. 1 to carry slide 18 to the right in the direction of the line of writing. Slide 18 is normally urged to the left of Fig. 1 by a spring, such as 181′, connected to an extension 182 at the end of lever 30. As shown in the portion B of the cam groove 32<sup>a</sup> of Fig. 1<sup>A</sup>, the roller 32 and with it the slide 18 is moved by the groove 32<sup>a</sup> to the right of Fig. 1, but this motion will not be a continuous one but even may be at times a motion backward or to the left in Fig. 1, as, for instance, in forming the loop of the letter "o". Such reverse movement will be relatively slight of course, and the undulations in the part B of the cam groove 32ª will give the desired horizontal components of the letters while the general motion of the pen to the right in Fig. 1 will be given by the large swing produced by the helical shape of the portion B of groove 32ª.

Member 16 is connected through a link 33 with a bell brank 34 carrying a cam roller 35, the bell crank being pivoted at 36 to the machine frame and urged by a spring 35¹ tending to swing bell crank 34 clockwise. Roller 35 engages in the groove 35ª of cam 20 to give the vertical components of the writing. By reason of the link connection between the member 16 and the end of the lever 34, the travel of the member 16 with the slide 18 will not materially affect the position of the roller 35. Hence the portion C of groove 35ª will merely have undulations in it to give the desired up and down or vertical components to the pen and the portion C will, therefore, be, in general, a circular groove but with undulations to give the desired vertical components.

On member 16 (see Fig. 3) is a vertical shaft 37 having a bearing in member 16 and also in a bracket 38 secured to said member. To this shaft is connected a lever 39 having one end engaging a slot in a lever 40 connected to cradle 13. To shaft 37 is also connected a lever 41 which, in turn, is connected through a link 42 with a cam lever 43 pivoted at 44 on the machine frame. Preferably I provide a spring 45 between the end of cam lever 43 and slide 18, so that pen 10 is held down on the paper with a yielding pressure. It will be noted that, as lever 43 moves to the right of Fig. 1, this motion is transmitted through link 42, and levers 41 and 39 to cradle 13, to bring the pen down on the paper, as shown in Fig. 2. Motion of lever 43 in the opposite direction will lift the pen. Cam lever 43 is provided with a cam roller or stud 46 which engages with the cam groove 46ª in the cylinder 20, this groove being arranged so that it acts on the right side of the roller, to lift the pen 10, the other side of the groove being cut away so that spring 45 operates to lower the pen 10. This cam groove is arranged so that, if desired, the pen will be held in either one or the other position as the pen is carried to the right in Fig. 1, the cam groove being provided with the necessary bumps and depressions to cause the pen to raise or lower at the end or the beginning of successive words. Since the pen is being carried to the right in Fig. 1 by the slide 18 through the action of the portion B of the cam groove 32ª and since the cam lever 43 is connected through various links with this pen, it follows that the roller 46 will be carried in general over the same kind of path as that of the roller 32, so that the portion A of the groove 46ª will be, in general, parallel to the portion B of the groove 32ª. It will, however, be provided with undulations to raise and permit the pen to be lowered as it is moving to the right in Fig. 1, the portion A being made wider than its roller to produce the cut-away portion referred to above.

With the arrangement so far described, the writing will be commenced with the rollers 46, 32 and 35 respectively in the cam groove portions A, B and C at the left of Fig. 1ᴬ. The cam 20 will begin to rotate and the portion B will carry the pen to the right in Fig. 1 and, at the same time, give the desired horizontal components to the letters in coordination with the other movements of the pen. Similarly the undulations in the portion C will give the desired vertical motions to the pen to produce the vertical components of the writing. The undulations in the portion A will raise the pen at the end of each letter or at any other desired time as the writing progresses.

When the cams have reached points in the respective grooves which are at the bottom of Fig. 1ᴬ, the end of the line to be written has been reached and if the machine is designed for writing only one line, then the parts could be restored to their original positions and the line repeated. As described hereinafter, however, the machine is designed to write a series of different lines, and the means by which this may be done will now be described.

In the form illustrated, the writing-receiving support is a table 47 supported on the frame of the machine and having, adjacent its top, a pair of feed rollers 48 and 49 geared together through gears 50, 51, roller 48 having a feed ratchet 52 arranged to be operated in a well-known manner by a pawl 53 on a pawl lever 54 swinging around the center of roller 48 (see Fig. 14).

When the end of the first line of writing has been reached, a second line may then be written with my apparatus, and to that end, the following mechanism is used:

During the writing of the first line, cylinder 20 is turned through one rotation by gears 27 and 28, the latter of which is mounted on a shaft 55 provided with a worm wheel 56 driven by a worm 57 on a shaft 58. Shaft 58 receives its power through bevel gears 59 and 60 the latter being connected to a driving shaft 61 receiving power through miter gears 62 and 63, the latter being connected to a main power shaft 64 which may receive its motion from any suitable source of power, such as an electric motor. Shaft 55 extends beneath slide 24, gear 28 being splined to this shaft so as to be rotated thereby while being free to move longitudinally of the shaft. Yokes 65 and 65' extend from the shaft of cam cylinder 20 to either side of gear 28 to cause gear 28 to slide along shaft 55 when cam cylinder 20 is moved longitudinally, as will be explained hereinafter.

Shaft 58 is mounted in a bearing 66 loosely pivoted on shaft 61 to permit the opposite end to drop a sufficient distance to permit the teeth of worm 57 to be disengaged from worm wheel 56. This opposite end of shaft 58 extends through a slotted bracket 67, the shaft resting on a cam 68, shown best in Fig. 9. Cam 68 is slidable longitudinally so that it may be moved to the left of Fig. 9 (in which position the high part of the cam is holding shaft 58 up so that worm 57 is in mesh with worm wheel 56) to permit shaft 58 to drop into a depression 69 to permit worm 57 to drop out of engagement with worm wheel 56.

The longitudinal motion of cam 68 is given by a lever 70 on a shaft 71 (see Fig. 1) in brackets 72 on the frame of the machine, the shaft 71 having a lever 73 connected by links 74 and 75 to a lever 76 pivoted at 77 on the frame of the machine. The free end of lever 76 projects in the path of a pin 78 on the bottom of slide 18, so that as slide 18 reaches its extreme position to the right of Fig. 1, pin 78 contacts with the end of lever 76 to rotate shaft 71 to move cam 68 to cause worm 57 to drop out of mesh and thus stop the rotation of gear 27 and of cam cylinder 20, thus bringing to rest all of the parts controlling the motion of the pen to the right in Fig. 1.

In order to write the next line, it is necessary to bring a second set of cam grooves into operative position in relation to cam rollers 32, 35 and 46 and also to move the slide 18 and its associated parts to the position shown in Fig. 1. On slide 24 is a rack 79 meshing with gear 80 on a shaft 81 having a miter gear 82 meshing with a miter gear 83 on a shaft 84 carried in suitable bearings on the machine frame. On the opposite end of shaft 84 is a miter gear 85 meshing with a miter gear 86 on a shaft 87, which shaft is provided with a miter gear 88 meshing with a miter gear 89 on the shaft 90. The shaft 90 has fastened to it a worm wheel 91 meshing with a worm 92 on shaft 93 (see Fig. 11). Shaft 93 is similar in construction to shaft 58 and is arranged to be raised and lowered by a cam 94 longitudinally slidable and operated by a lever 95 and link 95', lever 95 being connected to a shaft 96 supported in bearings 97 and having a lever 98 on its opposite end, which lever is connected through links 99 and 100 with a lever 101 pivoted at 102 on the machine frame. The free end of lever 101 lies in the path of a pin 103 on slide 18, so that, shortly after pin 78 contacts with lever 76, pin 103 contacts with lever 101 to turn shaft 96 to move cam 94 to raise shaft 93 from the position shown in Fig. 11 into mesh with worm wheel 91 to start the shaft 90 rotating and thus to rotate through the connected shaft and gearing, gear 80, to move slide 24.

This longitudinal motion of slide 24 preferably takes place while cam cylinder 20 is not rotating and, by reason of the engagement of the cam grooves with rollers 32, 35 and 46, slide 18 and all of the connected parts are moved to the left of Fig. 1 into the position shown in that figure, bringing the pen 10 into its initial position. As slide 18 nears the position shown in Fig. 1, a pin 104 on slide 18 contacts with a lever 105 pivoted at 106 and connected through a link 107 with lever 101 to move the latter backward, and thus return shaft 96 and cam 94 to the position shown in Fig. 11, to bring slide 24 to rest in its new position. When the levers 43, 30 and 33 have reached the position shown in Fig. 1, the cam 20 may continue its motion to the left in Fig. 1, the rollers 46, 32 and 35 then running through the portions X, Y and Z, respectively, this motion being permitted by the free rotation of the cam 20 which at that time is disconnected from its driving gearing. In other words, the cam 20 at this time acts like a screw moving in a fixed nut, the equivalent of the fixed nut being the engagement of the cam rollers with the grooves X, Y and Z.

The net result of this motion of the cam 20 to the left of Fig. 1 is to restore the levers 43, 30 and 33 with their connected parts to the position shown in Fig. 1 and with the respective cam rollers at the beginning of new portions like the parts A, B and C of the cam grooves 46ª, 32ª and 35ª, ready to write the second line as soon as the cam driving gearing is again thrown into operation. It will be understood, of course, that the active portions of the respective cam grooves will have their undulations designed to correspond to the writing desired in the second line.

The new line of writing is begun by a pin 108 on slide 18 contacting with the end of a member 109 connected to the upper end of a lever 110 pivoted at 111 and connected by a link 112 with lever 76. Contact of pin 108 with member 109 swings lever 76 to its initial position to throw worm 57 into mesh to begin the rotation of cam cylinder 20. For another purpose to be described hereinafter, lever 110 is provided with a link 113 and a cross link 114, the latter carrying a roller 115 which normally rests against a portion of slideway 25 under pressure of a spring (not shown), so that normally member 109 is held in the path of pin 108.

Preferably I provide for an automatic shifting of the paper by rotating paper rollers 48, 49. To this end, I connect ratchet lever 54 through a link 116, bell crank 117 and link 118 with a lever 119 pivoted at 120, so that, if lever 119 is moved to the left of Fig. 1, ratchet 54 will be turned to move the paper the desired distance between the lines of writing. On slide 18 I provide a pin 121 to contact with the free end of lever 119, this lever preferably being arranged with a latch 122 pivoted at 123 and normally held in the position best shown in Fig. 13 by a spring 124, so that as pin 121 moves to the right of Fig. 1, latch 122 will be turned on its pivot to allow pin 121 to pass, and then, when slide 18 is moving to the left, to bring about an engagement between latch 122 and pin 121 to rotate lever 119, and thus move the paper.

The operations thus described are repeated for as many lines of writing as are desired and as there are sets of cams on cam cylinder 20. It will be understood that the cam grooves are readily formed by moving the pen 10 over the desired line of writing, at the same time, marking on a plain rotating cylinder like cam cylinder 20, the paths of cam rollers 32, 35 and 46 and then cutting the cam grooves to correspond to the positions thus outlined.

It is desirable to provide mechanism which will restore all of the parts of the machine to initial position at the end of any given number of lines, so as to be ready to repeat the writing. To this end, I first provide means by which after the predetermined number of lines have been written, cam cylinder 20 will be restored to its initial position, as shown in Fig. 1. On slide 24 and adjustably connected thereto is a cam 125 which, as slide 24 moves to the left in Fig. 1, will move roller 115 to swing member 109 out of the path of pin 108, so that, as slide 18 is being restored to its initial position after the last line of writing has been completed, there will be no motion of lever 76 to throw gear 27 into operation to rotate cam cylinder 20. Pin 104, however, will operate at this time to stop the motion of gear 80 which is moving slide 24 to the left of Fig. 1. Adjustably mounted on slide 24 is a bracket 126 having a pin 127 arranged to contact with the end of a lever 128 pivoted at 129 on the frame of the machine and connected by links 130 and 131 with a lever 132 on a shaft 133 carrying a lever 134 connected through a link 135 with a sliding cam 136 (Figs. 1 and 11). This cam is normally held in the position shown in Fig. 11 by a spring 137', at which time, a shaft 138 carrying a worm 139, is dropped so that worm 139 is out of mesh with a worm wheel 140 on a shaft 141 receiving motion through a gear 142 meshing with gear 62 on shaft 61. When lever 128 is moved by pin 127, shaft 133 is rotated to move cam 136 to the right of Fig. 11 to raise worm 139 into mesh with worm wheel 140 to start the rotation of shaft 141 which, through gears 142' and 143, starts the rotation of a cam shaft 144 mounted in suitable bearings on the frame. Above cam 136 is a pawl 137 arranged to engage in a notch 138' in cam 136 to hold the same in the position to which it is moved by pin 127, so that cam shaft 144 will continue to rotate after pin 127 is moving to the right of Fig. 1.

The first part of the rotation of cam 161 lifts cam rollers 32, 35 and 46 from their respective grooves, and my preferred arrangement for doing this is shown best in Figs. 1, 6, 7 and 8. The arrangement for each of the cam rollers is the same, so that a description of one of them will be sufficient. Cam roller 32 is mounted on the end of a vertically movable rod 145 slidable through cam lever 30 and a bracket 146 supported thereon and normally held downward by a spring 147. A collar 148 is provided with links 149 connected to a forked bell crank lever 150 pivoted at 151 on a bracket 152 on the cam lever 30. The opposite end of bell crank 150 is connected to a rack bar 153 having rack teeth 154 engaging with a segment 155 mounted concentric with the pivot center 31 of the cam lever 30. The segment 155 has attached to it a lever 156, the three levers 156 being connected through suitable links 157 with a link 158, which, in turn, is connected to a cam lever 159 carrying a cam roller 160 engaging with a cam 161. The first part of the rotation of cam 161 moves all of levers 156 to lift cam rollers 32, 35 and 46 out of their respective grooves through the motion of the several parts described. By pivoting segments 155 on the pivot centers of the cam levers, the latter may turn in the normal operation of writing a line without affecting the position of the rollers in the cam grooves.

As soon as the cam rollers are out of the cam grooves, slide 24 may be moved to the right of Fig. 1, and this is accomplished by reversing the direction of motion of gear 80. On cam shaft 144 is a cam 162 cooperating with a cam roller 163 on a cam lever 164 pivoted on a shaft 165 extending through brackets 166 and connected through a link 167 with a sliding cam 168 provided with a spring 169 to move it to the left of Fig. 10. Cam 168 extends beneath a shaft 170, similar to shaft 58, having a worm 171 adapted to mesh with a worm wheel 172 on a shaft 173 having a gear 174 engaging with the gear 88. Shaft 170 receives its motion from a gear 175 meshing with a gear 176 on the shaft 61. It will be noted that gear 174 rotates shaft 87 in a direction opposite the rotation given that shaft by gear 89, so that when gear 174 is rotated, gear 80 is turned so as to move slide 24 to the right of Fig. 1 to bring it back to the position shown in that figure.

When slide 24 and cam cylinder 20 are restored to initial position, cam 161 is arranged to cause rollers 32, 35 and 46 to drop, to re-engage the cam grooves, and to repeat the operation on a new sheet of paper which will have been inserted in paper rollers 48, 49 by the operator. The new line of writing is commenced by throwing worm gear 56 into operation, and this is accomplished by moving slide cam 68 by means of a cam 177 on the cam shaft 144, this cam cooperating with a roller 178 on a cam lever 179 pivoted on shaft 165 and connected by a link 181 with lever 70 on shaft 71. The rotation of cam 177, therefore, will move cam 68 to lift shaft 58 to start the rotation of cam cylinder 20.

All of the parts now having been restored to initial position and the machine started on a repetition of the writing, cam shaft 144 is brought to rest by a cam 182 on cam shaft 144, this cam contacting with an arm 183 on pawl 137 to lift the pawl out of notch 138' to permit spring 137' to restore cam 136 to the position shown in Fig. 11, with worm 139 disengaged from worm wheel 140.

The arrangement which I have just described is adapted to write a single letter or the like. If desired, it may be arranged to write a plurality of letters, and such modification is shown in Figs. 13 and 14, arranged to write three letters or the like, simultaneously. In such an arrangement, slide 18 has a supplemental slide 218 connected by cross ties 201 to cause slide 218 to move with slide 18, motion being given to slide 18 through cam lever 30 as in the single letter writing arrangement. Member 16 is duplicated at 216, 216, all of these members being connected through links 217, so that the motion given to member 16 by link 33 will be transmitted to members 216, 216. On each of members 216, as on member 16, is a cradle similar to that heretofore described, carrying a pen 10, each pen being arranged to cooperate with a writing-receiving table, each provided with a pair of rollers 48, 49 and operated by ratchets in the manner heretofore described, each of these ratchets being connected through bar 116 with ratchet levers 53. Each of these cradles is moved by the same mechanism heretofore described, a frame 220 connecting all of levers 41 so as to give them all the motion derived from cam lever 43.

In this modification, therefore, it will be evident that a plurality of similar letters may be written with the same arrangement and in the same manner as that heretofore described for a single letter.

While I have described my apparatus as it would be used for writing different lines in a letter or the like, it will be obvious that instead of writing, the reproduction may be of a drawing or the like which is to be repeated in separate steps.

It will also be understood that, while preferably I form the different sets of cams on the cam cylinder 20, these sets may be arranged in any other suitable manner so as to be brought into and out of cooperative relation with the respective cam rollers. It will also be understood that certain features of my invention may be used independently of other features. For instance, if desired, the cam shaft 144 may be dispensed with, so that the parts may be returned to normal position by the operator. While I have shown a preferred embodiment of my invention, it will be understood that the same may be varied within wide limits.

I claim:—

1. In a writing or drawing apparatus, a pen, means to support and move the pen longitudinally of and vertically to the line of writing and to lift and lower the pen from the writing-receiving surface, said means including a cam cylinder having a plurality of sets of cam grooves therein, each set being adapted to move the pen over a predetermined path to write the desired words in a line, means to shift the cylinder longitudinally at the completion of each line of writing to bring a different set of cam grooves into operative position, and means to rotate the cylinder between shifts.

2. In a writing or drawing apparatus, a pen, a support for the pen, means to move said support to raise and lower the pen from the writing-receiving surface, means to move said support vertically to the line of writing, means to move said support longitudinally of the line of writing, a cam cylinder having separate grooves to actuate each of said moving means, means to rotate the cylinder while it is stationary as to longitudinal motion to cause the pen to write a line of writing, and means to shift the cylinder longitudinally when the line of writing is completed, whereby the pen is returned to its initial position.

3. In a writing or drawing apparatus, a pen, a support for the pen, means to move said support to raise and lower the pen from the writing-receiving surface, means to move said support vertically to the line of writing, means to move said support longitudinally of the line of writing, a cam cylinder having separate grooves to actuate each of said moving means, and each of said moving means including a cam roller traveling in its respective one of said grooves, means to rotate the cylinder while it is stationary as to longitudinal motion to cause the pen to write a line of writing, means to shift the cylinder longitudinally when the line of writing is completed and while said rollers are in their respective grooves, whereby the pen is returned to its initial position and the rollers are brought respectively to the beginning of different cam grooves, and means to lift the cam rollers from the grooves and to return the cylinder to its initial position when the last line of writing has been completed.

4. In a writing or drawing apparatus, a pen, means to support and move the pen longitudinally of and vertically to the line of writing and to lift and lower the pen from the writing-receiving surface, said means including a cam cylinder having a plurality of sets of cam grooves therein and a cam roller in each groove of a set, each set being adapted to move the pen over a predetermined path to write the desired words in a line, means to shift the cylinder longitudinally at the completion of each line of writing while the cam rollers are in the grooves to bring a different set of cam grooves into operative position, means to rotate the cylinder between longitudinal shifts, and means to lift the cam rollers from the grooves and to return the cylinder to initial position when the last line of writing has been completed.

JAMES G. HENDRICKSON.